2,868,789
METHOD OF MAKING MELAMINE

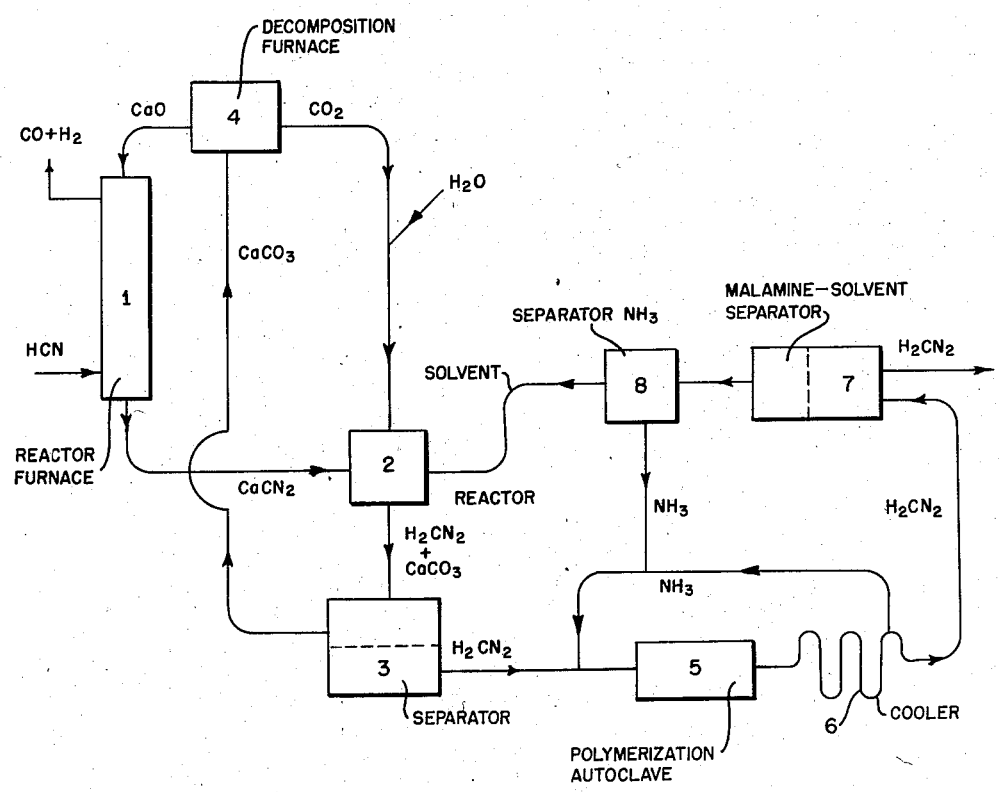

Armand Jean Courtier, Meudon, France, assignor to Societe Anonyme des Manufactures des Glaces et Produits Chimiques de Saint-Gobain, Chauny & Cirey, Paris, France Application July 7, 1955, Serial No. 520,594

Claims priority, application France July 9, 1954

10 Claims. (Cl. 260—249.7)

This invention relates to the manufacture of melamine. It is an improvement in a known process.

There is a known process for making melamine starting from hydrocyanic acid, HCN, and quick lime, CaO, the HCN and CaO being reacted in a first step to form calcium cyananamide, $CaCN_2$, carbon monoxide, CO, and hydrogen, $H_2$. The reaction goes according to the equation $CaO + 2HCN \rightarrow CaCn_2 + CO + H_2$. In a second stage the calcium cyanamide is hydrolized, reacted with carbon dioxide, and transformed to cyanamide $CN_2H_2$ and calcium carbonate according to the reaction $$CaCN_2 + CO_2 + H_2O \rightarrow CaCO_3 + CN_2H_2$$

In a third stage of the process the cyanamide $CN_2H_2$ is transformed by heat polymerization to its trimer, melamine, $(CN_2H_2)_3$.

According to the present improvement on the foregoing process the process is carried out under such conditions, in a closed cyclic system, that nothing need be added to the system except hydrocyanic acid, HCN, and water, $H_2O$. Furthermore, the system discharges only CO and $H_2$ which are themselves useful in the process, and melamine itself. The process is therefore of the highest efficiency, self-contained, and very useful.

The particular conditions which make possible this advance in the technology of the manufacture of melamine are set forth in the following description and particularly indicated in the attached claims.

Objects and advantages of the invention will appear from time to time as the description of the process proceeds.

Referring now to the figure of the drawing, which is a flow sheet of the novel process, a reactor furnace 1, which is preferably made of non-ferrous metal such as copper, receives in different localities, for instance at opposite extremities of the furnace, quick lime, CaO, and hydrocyanic acid, HCN. The quick lime is preferably pure and powdered and travels counter current to the direction of travel of the hydrocyanic acid. Thus, at one end of the furnace carbon monoxide and hydrogen pass off and at the other end calcium cyanamide leaves the reactor furnace and travels to a reactor 2 which is a container in which is carried out the second step of the process. In this reactor the calcium cyanamide is mixed with a solvent, with carbon dioxide, and with water, thus undergoing hydrolysis and carbonation simultaneously. The solvent employed is preferably organic and is preferably water miscible. Examples of such solvents are numerous and the glycols are representative thereof. The products formed in reactor 2 are cyanamide $H_2CN_2$ and calcium carbonate, $CaCO_3$. These reaction products proceed from the reactor 2 to a separator 3 from which the calcium carbonate is extracted in one direction and the cyanamide in another.

The cyanamide passes to a polymerization autoclave 5 wherein it is heated to polymerization temperature under pressure at approximately 220° C. and preferably in the presence of ammonia. The melamine thus formed $(H_2CN_2)_3$ in the organic solvent then passes to a cooler 6 which expels most of the ammonia from the solution; the solution then passes to a melamine-solvent separator and the melamine is then passed to storage. The separator may conveniently be of centrifugal type. The solvent thus extracted passes to an ammonia separator, where the remainder of the ammonia is withdrawn, and the solvent returns to reactor 2.

The process thus generally described has many features of novelty which make it a closed system to which one need add only HCN and $H_2O$. This is accomplished by separations and recyclings of various ingredients which are carried out continuously during the operation of the process. The reactor 2 directs cyanamide and calcium carbonate to the separator 3 from which the calcium carbonate is returned to a decomposition furnace 4, in which carbon dioxide and quick lime are formed by heating the calcium carbonate to its temperature of decomposition, the quick lime being recycled or returned to the reactor furnace 1 and the carbon dioxide being recycled or returned to the reactor 2. Water is added to the carbon dioxide as it progresses toward the reactor 2 from the decomposition furnace 4 and the water is preferably added in vapor phase. The carbon dioxide and water can be added separately to the reactor 2 but it is advantageous to mix them prior to admitting them to the reactor.

From the separator 3 the cyanamide goes to the polymerization autoclave 5 and is preferably admixed with ammonia along the way, as indicated in the flow sheet. After the polymerization the solvent, ammonia, and melamine go to a cooler, which expels the greater part of the ammonia from the solution, and this ammonia is recycled, as indicated in the drawing, to the cyanamide traveling toward the autoclave. The melamine from the cooler passes to a melamine-solvent separator, which is preferably of centrifugal type, and the melamine is drawn off and stored or sold as desired. The solvent passes to an ammonia separator from which the remainder of the ammonia is recycled to the cooler-separator system for admixture with the cyanamide as shown. This leaves the organic, water-miscible solvent in a condition capable of being used again as the reaction medium and it is returned to the reactor 2.

In the foregoing way water, carbon dioxide and calcium cyanamide react together with the production of calcium carbonate and cyanamide, the calcium carbonate being sent to a decomposition furnace where it is transformed to quick lime and carbon dioxide, the quick lime being recycled through the first step of the process, and the carbon dioxide being recycled through the second step. The ammonia used in the polymerization autoclave is separated from the mixture and recycled.

The reactor furnace is reheated between 550 and 900° C. It is a material advantage of the invention that the quick lime is pure, and contains no traces of iron; the yield of this reaction is above 95% of cyanamide and the cyanamide does not undergo a simultaneous partial polymerization. The calcium cyanamide is preferably cooled after issuing from the reactor furnace 1 but the cooler is not shown in the flow sketch. The water, carbon dioxide and calcium cyanamide can be added simultaneously to the reactor 2, the water being permissibly added as liquid but preferably as vapor. The calcium cyanamide is then hydrolized by water to free cyanamide and the lime is made into calcium carbonate by the carbon dioxide so that when the reaction mixture leaves the apparatus there is a solution of free cyanamide in glycol holding calcium carbonate in suspension. This mixture is sent to the separator 3 and the calcium carbonate is removed.

At the discharge end of the autoclave the cooling liberates the greater part of the ammonia and precipitates the melamine. The melamine suspension in glycol is then sent to the separator 7.

The carbon monoxide and hydrogen which are discharged from the reactor furnace are not wasted but are burned to contribute to the heating of reactor furnace 1 and decomposition furnace 4.

The following example illustrates the process:

Into a copper furnace of 150 mm. diameter and 3 m. length there was introduced continuously 50 kgs. per hr. of hydrocyanic acid in gas phase and 58 kgs. per hr. of pure quick lime in powder form. The temperature of the furnace was maintained between 650 and 800° C. There are issued from the furnace through a lock 82 kgs. per hr. of calcium cyanamide of a purity between 95 and 97%. After cooling, the calcium cyanamide was introduced continuously into a compartmented recepticle into which there arrived simultaneously 600 liters per hour of diethylene glycol and 26 cu. meters per hour of carbon dioxide to which had been added 25 kgs. of water vapor, which is to say 9 kgs. more than the theoretical quantity.

This reaction is exothermic and it was kept to a temperature around 50° C. by circulating water around the walls of the reactor.

The suspension issuing from the reactor was sent to a centrifuge which removed the calcium carbonate. The calcium carbonate was washed to remove the diethylene glycol with which it was impregnated. The calcium carbonate was then sent to a decomposition furnace where it was transformed into carbon dioxide and quick lime by heating.

The solution of cyanamide in diethylene glycol was separated from excess water by distillation under vacuum. There was thus recovered about 66.6 kgs. of cyanamide per cu. meter. To this there was added 80 kgs. per cu. meter of ammonia and it was sent to an autoclave at a rate of .6 cu. meter per hour at 40 kgs. pressure, the autoclave being tubular and heated to 220° C. This polymerized the cyanamide to melamine. At the discharge end of the apparatus the liquid was chilled, releasing most of its ammonia, and the melamine was precipitated and separated by centrifugal means. The ammonia was returned to the incoming solution of cyanamide. After washing the cakes impregnated with diethylene glycol there was obtained very pure melamine at an average rate of 40 kgs. per hour. The yield was 74 kgs. of melamine for 100 kgs. of hydrocyanic acid introduced, which represents a yield of 95% of that which is possible in theory.

It will be realized, from the foregoing description, that the process is characterized by the following reactions:

(a) $CaO + 2HCN \rightarrow CaCN_2 + CO + H_2$
(b) $CaCN_2 + CO_2 + H_2O \rightarrow CaCO_3 + H_2CN_2$
(c) $3H_2CN_2 \rightarrow (H_2CN_2)_3$
(d) $CaCO_3 \rightarrow CaO + CO_2$ The lime and carbon dioxide recovered in Reaction d are returned to Reactions a and b respectively. In the preferred form of the invention Reactions b and c are carried out in an organic solvent medium which is itself miscible with water. For example, the glycols such as, for instance, diethylene glycol. There are many organic solvents which answer this need and the choice of a satisfactory solvent, the general principle having been expressed, may be left to the technician. The solvent is recycled after separation from the melamine.

The Reaction b is preferably carried out by introducing the water to the solvent in vapor phase and preferably by mixing it in advance with the carbon dioxide necessary to the reaction. The Reaction c, which involves the polymerization of cyanamide to its trimer melamine, is preferably carried out by heating under pressure at a temperature on the order of 220° C. It follows from the temperature employed in this stage that the organic solvent should have a boiling point such that it does not vaporize under the conditions of the reaction.

Once the system has been established and is in operation, it requires only trivial additions from time to time of solvent or ammonia to replace accidental leakage. Appropriate valves are located in the proper parts of the apparatus to permit such occasional additions. It will be observed that the fundamental reaction involves the continuous addition of hydrocyanic acid and water which react according to the reaction:

$$6HCN + 3H_2O \rightarrow (H_2CN_2)_3 + 3CO + 3H_2$$

the other ingredients enter into the reaction time and again as they recirculated through the system.

As above stated the reactor furnace 1 must be made from a nonferrous metal. Apparatus 2 to 8 need not to be made from nonferrous metal although care must be taken in order that no trace of iron can pass in the materials circulating in the cyclic system.

As many apparently widely different embodiments of the present invention may be made without departing from the spirit and scope thereof, it is to be understood that the invention is not limited to the specific embodiments.

What is claimed is:

1. In a process for making melamine wherein HCN is reacted with CaO in a first step to form $CaCN_2$, CO, and $H_2$, in a second step $CaCN_2$ is reacted with $CO_2$ and $H_2O$ to form $CaCO_3$ and $H_2CN_2$, and in a third step the $H_2CN_2$ is polymerized to form melamine, the steps which comprise carrying out the second and third steps in an organic solvent miscible with water, separating the melamine from the solvent and returning the solvent to the second step, adding the $H_2O$ to the second step as a vapor, adding the $CO_2$ and the water to the second step simultaneously, decomposing the $CaCO_3$ from the second step to form CaO and $CO_2$ and returning the CaO to the first step, and returning the $CO_2$ from the decomposition to the second step.

2. In a process for making melamine wherein HCN is reacted with CaO in a first step to form $CaCN_2$, CO, and $H_2$, in a second step $CaCN_2$ is reacted with $CO_2$ and $H_2O$ to form $CaCO_3$ and $H_2CN_2$, and in a third step the $H_2CN_2$ is polymerized to form melamine, the steps which comprise carrying out the second and third steps in an organic solvent miscible with water, separating the melamine from the solvent and returning the solvent to the second step.

3. In a process for making melamine wherein HCN is reacted with CaO in a first step to form $CaCN_2$, CO, and $H_2$, in a second step $CaCN_2$ is reacted with $CO_2$ and $H_2O$ to form $CaCO_3$ and $H_2CN_2$, and in a third step the $H_2CN_2$ is polymerized to form melamine, the steps which comprise vaporizing $H_2O$, mixing it with $CO_2$, and adding the mixture to the second step.

4. In a process for making melamine wherein HCN is reacted with CaO in a first step to form $CaCN_2$, CO, and $H_2$, in a second step $CaCN_2$ is reacted with $CO_2$ and $H_2O$ to form $CaCO_3$ and $H_2CN_2$, and in a third step the $H_2CN_2$ is polymerized to form melamine, the steps which comprise decomposing the $CaCO_3$ from the second step to form CaO and $CO_2$ and returning the CaO to the first step.

5. In a process for making melamine wherein HCN is reacted with CaO in a first step to form $CaCN_2$, CO, and $H_2$, in a second step $CaCN_2$ is reacted with $CO_2$ and $H_2O$ to form $CaCO_3$ and $H_2CN_2$, and in a third step the $H_2CN_2$ is polymerized to form melamine, the steps which comprise decomposing the $CaCO_3$ from the second step to form CaO and $CO_2$ and returning the $CO_2$ from the decomposition to the second step.

6. In a process for making melamine wherein HCN is reacted with CaO in a first step to form $CaCN_2$, CO, and $H_2$, in a second step $CaCN_2$ is reacted with $CO_2$ and $H_2O$ to form $CaCO_3$ and $H_2CN_2$, and in a third step the $H_2CN_2$ is polymerized to form melamine, the steps which comprise decomposing the $CaCO_3$ from the second step to form CaO and $CO_2$, returning the CaO to the first step, and returning the $CO_2$ to the second step.

7. In a process for making melamine wherein HCN is reacted with CaO in a first step to form $CaCN_2$, CO, and $H_2$, in a second step $CaCN_2$ is reacted with $CO_2$ and $H_2O$ to form $CaCO_3$ and $H_2CN_2$, and in a third step the $H_2CN_2$ is polymerized to form melamine, the steps which comprise adding the $H_2O$ and the $CO_2$ simultaneously to the second step in the vapor phase, decomposing the $CaCO_3$ from the second step to form CaO and $CO_2$, returning the CaO to the first step, and returning the $CO_2$ from the decomposition to the second step.

8. In a process for making melamine wherein HCN is reacted with CaO in a first step to form $CaCN_2$, CO, and $H_2$, in a second step $CaCN_2$ is reacted with $CO_2$ and $H_2O$ to form $CaCO_3$ and $H_2CN_2$, and in a third step the $H_2CN_2$ is polymerized to form melamine, the steps which comprise carrying out the second and third steps in an organic solvent miscible with water, separating the melamine from the solvent and returning the solvent to the second step, and adding the $H_2O$ to the second step as a vapor.

9. In a process for making melamine wherein HCN is reacted with CaO in a first step to form $CaCN_2$, CO, and $H_2$, in a second step $CaCN_2$ is reacted with $CO_2$ and $H_2O$ to form $CaCO_3$ and $H_2CN_2$, and in a third step the $H_2CN_2$ is polymerized to form melamine, the steps which comprise carrying out the second and third steps in an organic solvent miscible with water and in the presence of ammonia.

10. In a process for making melamine wherein HCN is reacted with CaO in a first step to form $CaCN_2$, CO, and $H_2$, in a second step $CaCN_2$ is reacted with $CO_2$ and $H_2O$ to form $CaCO_3$ and $H_2CN_2$, and in a third step the $H_2CN_2$ is polymerized to form melamine, the steps which comprise carrying out the second and third steps in an organic solvent miscible with water in the presence of ammonia, and separating ammonia from the melamine and solvent and returning the ammonia to the third step.

References Cited in the file of this patent

UNITED STATES PATENTS

| Number | Name | Date |
|---|---|---|
| 1,444,256 | Lindholm | Feb. 6, 1923 |
| 1,671,183 | Erickson | May 29, 1928 |
| 1,678,721 | Buchanan | July 31, 1928 |
| 2,191,361 | Widmer | Feb. 20, 1940 |
| 2,206,005 | Grim | June 25, 1940 |
| 2,206,603 | Foster | July 2, 1940 |
| 2,373,869 | Wintringham | Apr. 17, 1945 |
| 2,737,513 | Mackay | Mar. 6, 1956 |

FOREIGN PATENTS

| Number | Country | Date |
|---|---|---|
| 1,000,501 | France | Oct. 17, 1951 |
| 1,108,481 | France | Aug. 31, 1955 |
| 628,255 | Great Britain | Aug. 25, 1949 |
| 677,167 | Great Britain | Aug. 13, 1952 |

OTHER REFERENCES

Thorpe: Dictionary of Applied Chemistry, vol. 2, page 219, 4th ed. (1938).

Mellor's Modern Inorganic Chemistry Revised Ed., 1939, pages 625–626, Longmans Green and Co. (1946).